United States Patent
Deguchi

(10) Patent No.: US 9,361,213 B2
(45) Date of Patent: Jun. 7, 2016

(54) METHOD AND APPARATUS FOR EFFICIENT REMOTE COPY

(71) Applicant: Akira Deguchi, Santa Clara, CA (US)

(72) Inventor: Akira Deguchi, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 195 days.

(21) Appl. No.: 13/747,586

(22) Filed: Jan. 23, 2013

(65) Prior Publication Data

US 2014/0208048 A1    Jul. 24, 2014

(51) Int. Cl.
*G06F 3/06* (2006.01)
*G06F 12/00* (2006.01)
*G06F 11/20* (2006.01)

(52) U.S. Cl.
CPC ............ *G06F 12/00* (2013.01); *G06F 11/2064* (2013.01); *G06F 11/2074* (2013.01); *G06F 2201/855* (2013.01)

(58) Field of Classification Search
CPC ...................................................... G06F 3/065
USPC ................................................ 711/114, 162
See application file for complete search history.

(56) References Cited

U.S. PATENT DOCUMENTS

| 7,865,680 | B2 | 1/2011 | Takahashi et al. |
| 2006/0277378 | A1* | 12/2006 | Morishita ............... G06F 3/061 711/162 |
| 2008/0301386 | A1* | 12/2008 | Matsui et al. ................. 711/162 |

FOREIGN PATENT DOCUMENTS

EP    1 643 367 A1    4/2006

OTHER PUBLICATIONS

European Search Report received in corresponding European Application No. 13183268 dated Jun. 24, 2014.

* cited by examiner

*Primary Examiner* — Kevin Verbrugge
*Assistant Examiner* — Zubair Ahmed
(74) *Attorney, Agent, or Firm* — Mattingly & Malur, PC

(57) ABSTRACT

According to one aspect of the invention, a storage system comprises: a plurality of storage devices; and a controller operable to manage a secondary volume, of a remote copy pair with a primary volume of another storage system, and corresponding to a portion of the plurality of storage devices. The secondary volume has a function for storing data included in journal data sent from said another storage system according to a remote copy procedure. The controller is operable to handle the journal data to be stored temporarily in a third volume corresponding to another portion of the plurality of storage devices before storing the data of the journal data to the secondary volume, if a relationship between the journal data and another journal data, which has smaller sequence number than sequence number of the journal data and is sent from said another storage system to the storage system, has a condition.

20 Claims, 17 Drawing Sheets

METHOD AND APPARATUS FOR EFFICIENT REMOTE COPY

BACKGROUND OF THE INVENTION

The present invention relates generally to storage systems, remote copy systems, and data copy method of the remote copy system and, more particularly, to management methods to reduce the number of times of data transfer within the storage system.

Many products of storage system have remote copy functionality for disaster recovery. The remote copy functionality copies the data stored in a primary volume (storage area) in a primary storage system to a secondary volume in a secondary storage system. The remote copy is classified into two types: synchronous remote copy and asynchronous remote copy. The synchronous remote copy transfers the data synchronously with the write operation from the server, whereas the asynchronous remote copy transfers the data asynchronously with the write operation from the server.

U.S. Pat. No. 7,865,680 describes a data copy method of asynchronous remote copy. Asynchronous remote copy does not transfer the data to the secondary volume directory from the primary volume; rather, before storing in the secondary volume, it transfers the data to a buffer area. The buffer area is described as a journal volume. The buffer area may include cache memory. The reason for once transferring the data to the buffer area such as a journal volume is to assure data consistency by making a write order to the SVOL (secondary volume) and a write order to the PVOL (primary volume) from the server the same.

Because the data is transferred to the buffer in the asynchronous remote copy, a processing overhead will be large and the utilization efficiency of the hardware such as a cache memory will decrease. As a result, system performance will decrease.

BRIEF SUMMARY OF THE INVENTION

Exemplary embodiments of the invention provide a technique to reduce the number of times of data transfer within the storage system during data copy such as remote copy. The secondary storage system transfers the data to the SVOL directly when there are no other JNLs (journals) that have the same copy destination address. By using this invention, the number of data transfer is reduced. As a result, the utilization efficiency of cache memory and processors will increase.

In accordance with an aspect of the present invention, a storage system comprises: a plurality of storage devices; and a controller operable to manage a secondary volume, of a remote copy pair with a primary volume of another storage system, and corresponding to a portion of the plurality of storage devices. The secondary volume has a function for storing data included in journal data sent from said another storage system according to a remote copy procedure. The controller is operable to handle the journal data to be stored temporarily in a third volume corresponding to another portion of the plurality of storage devices before storing the data of the journal data to the secondary volume, if a relationship between the journal data and another journal data, which has smaller sequence number than sequence number of the journal data and is sent from said another storage system to the storage system, has a condition.

In some embodiments, the controller is operable to handle the journal data to be stored directly to the secondary volume without being stored temporarily in the third volume, if the relationship does not have the condition. The third volume is in one portion of a cache memory of the controller and the secondary volume is in another portion of the cache memory of the controller. The controller is operable to: receive a plurality of journal data each with a sequence number from said another storage system, the sequence number being control information to manage a write order for writing data to the primary volume; select a journal data with a smallest sequence number from the plurality of received journal data which has not been stored to the secondary volume or the third volume; determine whether there is any unreceived journal data which has a smaller sequence number than the sequence number of the selected journal data; and if there is unreceived journal data as said another journal data which has a smaller sequence number than the sequence number of the selected journal data, as the condition, then storing data of the selected journal data temporarily in the third volume before storing the data of the selected journal data to the secondary volume.

In specific embodiments, the controller is operable, if there is no unreceived journal data which has a smaller sequence number than the sequence number of the selected journal data, to: determine whether there is any received journal data which has a smaller sequence number than the sequence number of the selected journal data and which has a same restore address as the selected journal data, the restore address being an address in the secondary volume to write journal data; and if there is received journal data as said another journal data which has a smaller sequence number than the sequence number of the selected journal data and which has a same restore address as the selected journal data, as the condition, then storing data of the selected journal data temporarily in the third volume before storing the data of the selected journal data to the secondary volume.

In some embodiments, the controller is operable, if there is no received journal data as said another journal data which has a smaller sequence number than the sequence number of the selected journal data and which has a same restore address as the selected journal data, to write the selected journal data in the secondary volume directly without being stored temporarily in the third volume.

In specific embodiments, the storage system further comprises a buffer. The journal data sent from said another storage system is stored in the buffer before the data of the journal data is stored to the secondary volume or the third volume.

Another aspect of the invention is directed to a system which includes a primary storage system having a plurality of storage devices; and a secondary storage system. The secondary storage system comprises: a plurality of storage devices; and a controller operable to manage a secondary volume, of a remote copy pair with a primary volume of the primary storage system, and corresponding to a portion of the plurality of storage devices in the secondary storage system. The secondary volume has a function for storing data included in journal data sent from the primary storage system according to a remote copy procedure. The controller is operable to handle the journal data to be stored temporarily in a third volume corresponding to another portion of the plurality of storage devices of the secondary storage system before storing the data of the journal data to the secondary volume, if a relationship between the journal data and another journal data, which has smaller sequence number than sequence number of the journal data and is sent from the primary storage system to the secondary storage system, has a condition.

Another aspect of this invention is directed to a computer-readable storage medium storing a plurality of instructions for controlling a data processor for remote copy from a primary storage system to a secondary storage system having a plurality of storage devices. The plurality of instructions comprise: instructions that cause the data processor to manage a secondary volume, of a remote copy pair with a primary volume of the primary storage system, and corresponding to a portion of the plurality of storage devices, the secondary volume having a function for storing data included in journal data sent from the primary storage system according to a remote copy procedure; and instructions that cause the data processor to handle the journal data to be stored temporarily in a third volume corresponding to another portion of the plurality of storage devices of the secondary storage system before storing the data of the journal data to the secondary volume, if a relationship between the journal data and another journal data, which has smaller sequence number than sequence number of the journal data and is sent from the primary storage system to the secondary storage system, has a condition.

These and other features and advantages of the present invention will become apparent to those of ordinary skill in the art in view of the following detailed description of the specific embodiments.

DETAILED DESCRIPTION OF THE INVENTION

Figure 1:
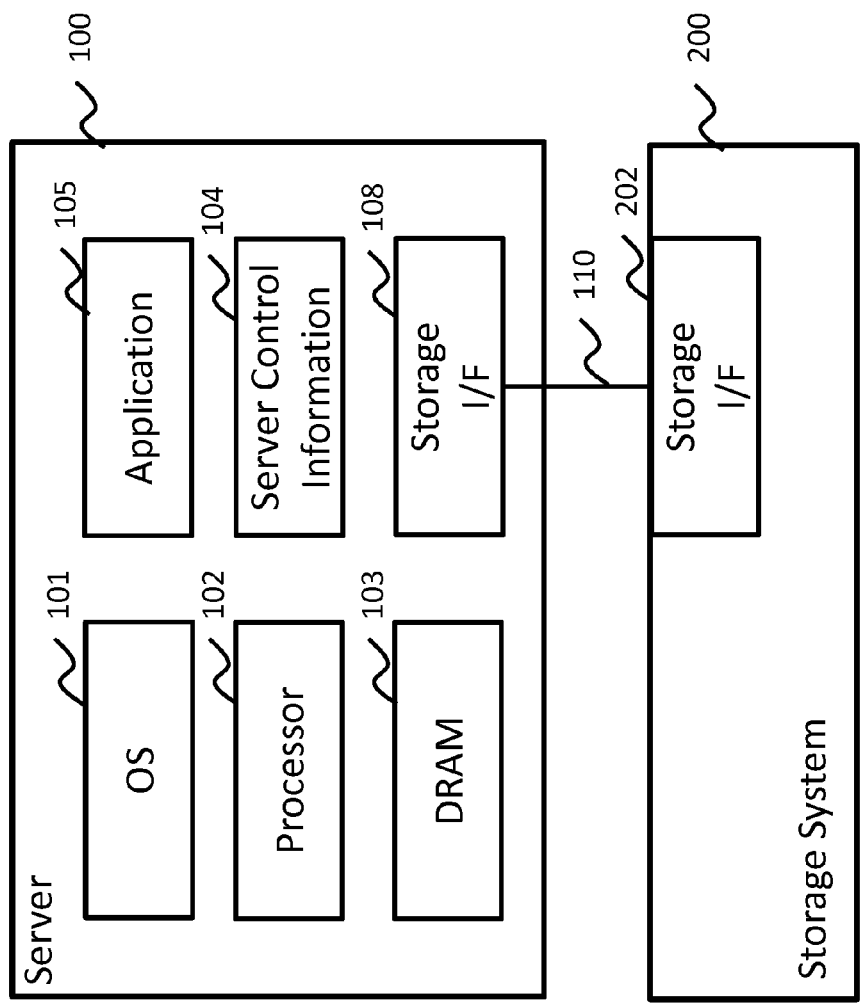
FIG. 1 is a diagram showing a computer system focusing on the server in accordance with an embodiment of the present invention.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium including non-transient medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for reducing the number of times of data transfer within the storage system during data copy such as remote copy, thereby improving performance.

FIG. 1 is a diagram showing a computer system focusing on the server in accordance with an embodiment of the present invention. The computer system includes a server 100 and a storage system 200. The server has an OS (Operating System) 101, a processor 102, a DRAM 103, server control information 104, an application 105, and a storage I/F (interface) 108. The server 100 provides service by executing an OS and applications such as a database system. The data processed by the database system is stored in the storage system 200. The server 100 is coupled to the storage system 200 via a network 110.

Figure 2:
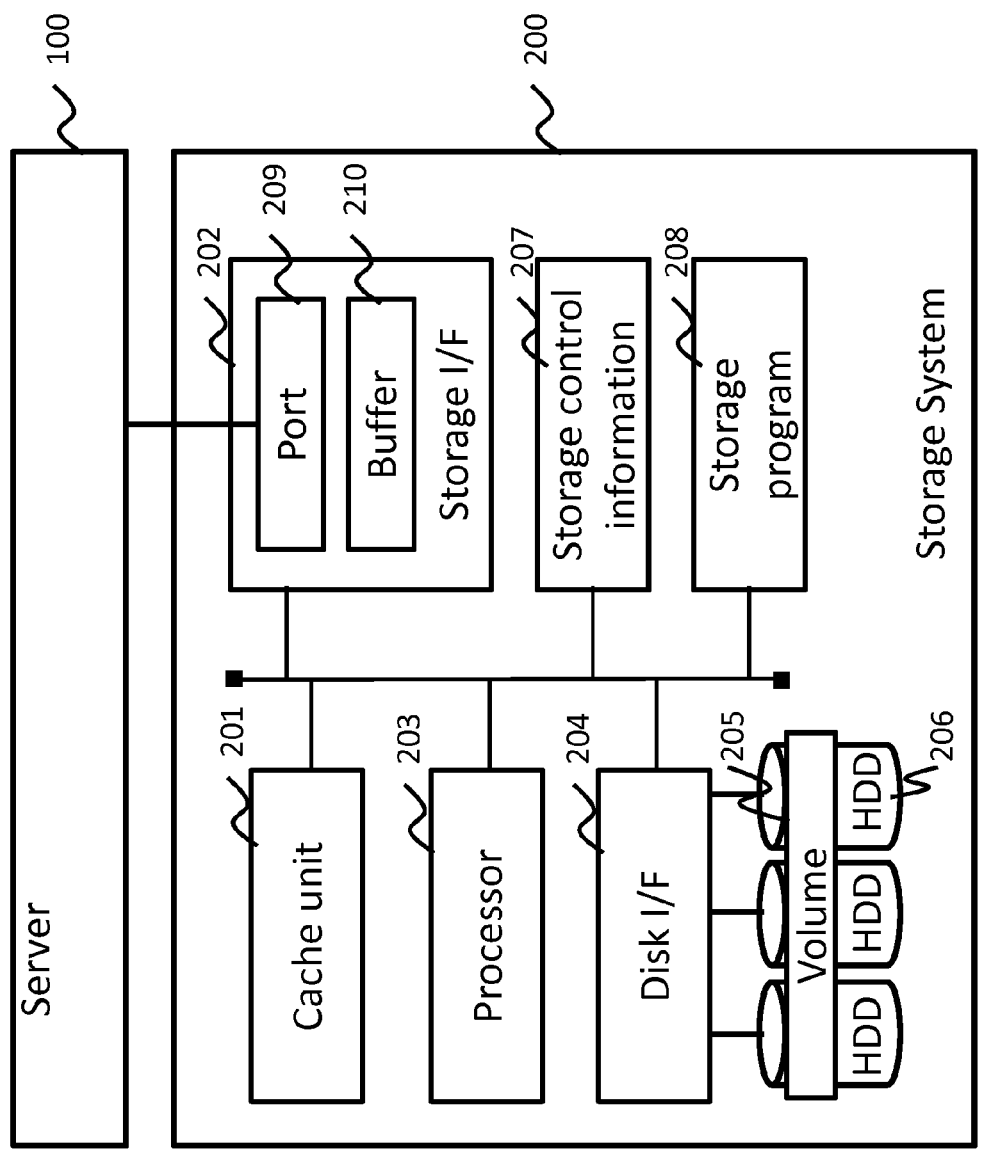
FIG. 2 is a diagram showing the computer system focusing on the storage system in accordance with an embodiment of the invention.

FIG. 2 is a diagram showing the computer system focusing on the storage system in accordance with an embodiment of the invention. The storage system 200 includes a cache unit 201, a storage I/F 202, a processor 203, a disk I/F 204, a volume 205, HDD (hard disk drive) 206, storage control information 207, and a storage program 208.

The storage I/F 202 has one or more ports 209 and a buffer 210. The port 209 is coupled to the server 100 via the network 110, and mediates communication with the server 100. The buffer 210 is a temporary storage area to store the transfer data between the server 100 and the storage system 200. The processor 203 executes a wide variety of processing by executing a wide variety of programs that have been stored into the storage program 208. Moreover, the processor 203 executes a wide variety of processing by using a wide variety of information that has been stored into the storage control information 207. The disk I/F 204 is coupled to at least one HDD 206 as an example of a physical storage device via a bus. The volume 205 that is configured to manage data is configured by at least one storage region of the HDD 206, for instance. The physical storage device is not restricted to an HDD 206 and can also be an SSD (Solid State Drive) or a DVD, for instance. Moreover, at least one HDD 206 can be collected up in a unit of a parity group, and a high reliability technique such as a RAID (Redundant Arrays of Independent Disks) can also be used. The storage control information 207 stores a wide variety of information used by a wide variety of programs. The storage program 208 stores a wide variety of programs, such as a read processing program, a write processing program and the like. The cache unit 201 caches the data stored in the HDD 206 for performance boost.

Figure 3:
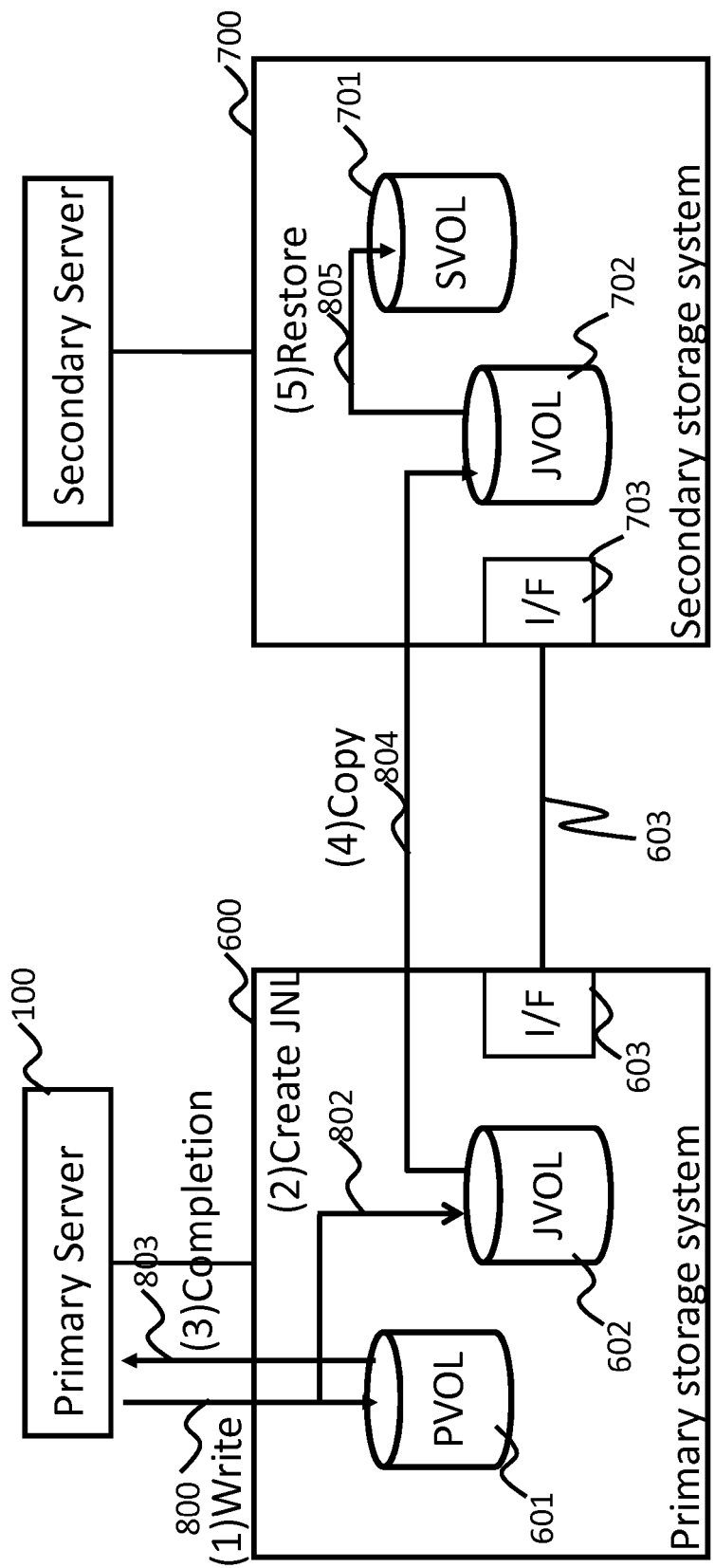
FIG. 3 is an example of remote copy configuration.

FIG. 3 is an example of remote copy configuration. A primary storage system 600 is a source storage system of remote copy and includes a primary volume (PVOL) 601 which stores the data used by the server, a journal volume (JVOL) 602 which stores the transfer data temporarily, and a storage I/F 603 which is connected to the secondary storage system 700. A secondary storage system 700 is a destination storage system of remote copy and includes a secondary volume (SVOL) 701 which stores copied data from the PVOL 601, a JVOL 702 which stores the transfer data temporarily, and a storage I/F 703 which is connected to the primary storage system 600. The relationship between the PVOL 601 and SVOL 701 is called a remote copy pair. The primary storage system 600 and the secondary storage system 700 have one or more storage I/Fs 603, 703 for data transferring.

The asynchronous remote copy processing flow is described simply as follows. The primary storage system 600 receives a write request from the server 100. The primary storage system 600 stores the write data in the PVOL 601 and JVOL 602 as a Journal (JNL). The JNL is a transfer data and the JVOL 602 is a storage area to store the JNLs temporarily. The JVOL does not necessarily need to be a volume. The JNLs could be stored in the cache unit 201. After that, the primary storage system 600 sends the completion message to the server. The JNLs are transferred asynchronously to the JVOL 702 in secondary storage system 700. Finally, The JNLs stored in JVOL 702 are copied to the SVOL 701. In more details, the JNL consists of journal control block (JNCB) and journal data (JNL data). The JNL data is a copy of the written data. The JNCB includes JNL data address on JVOL, copy destination address on SVOL, and write sequence information of write request from the server 100. The write sequence information is described in FIG. 4.

Figure 4:
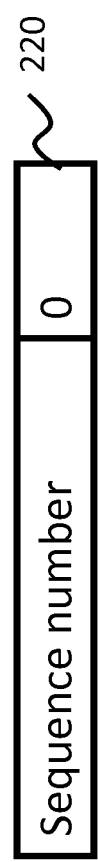
FIG. 4 is an example of a sequence number.

FIG. 4 is an example of a sequence number 220. In this example, the current value of the sequence number is "0." The "0" will be assigned to the next write request from the server 100. Although this figure shows the example which manages only one sequence number, sequence number for every unit which guarantees consistency could be managed. In general, the unit is called a consistency group.

Figure 5:
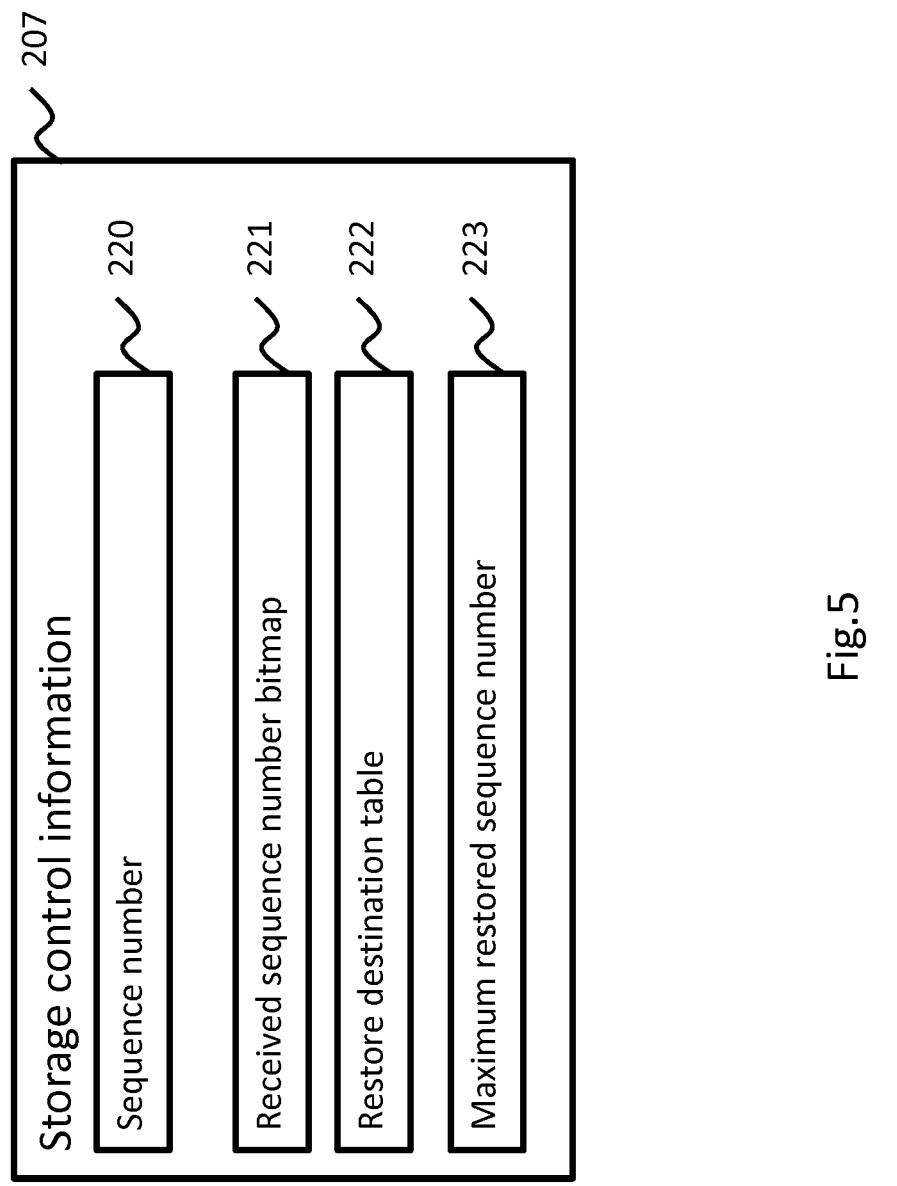
FIG. 5 is a detailed block diagram showing an example of the storage control information.

FIG. 5 is a detailed block diagram showing an example of the storage control information 207. The sequence number 220 is used in the primary storage system 600. A received sequence number bitmap 221, a restore destination table 222, and a maximum restored sequence number 223 are used in the secondary storage system 700. The sequence number 220 is control information to manage the write order from the server 100. The received sequence number bitmap 221 manages the sequence numbers of copied JNLs to the secondary storage system. The restore destination table 222 manages the JNLs to be restored for every restore destination address. The maximum stored sequence number 223 manages the maximum sequence number of JNLs restored to the SVOL.

Figure 6:
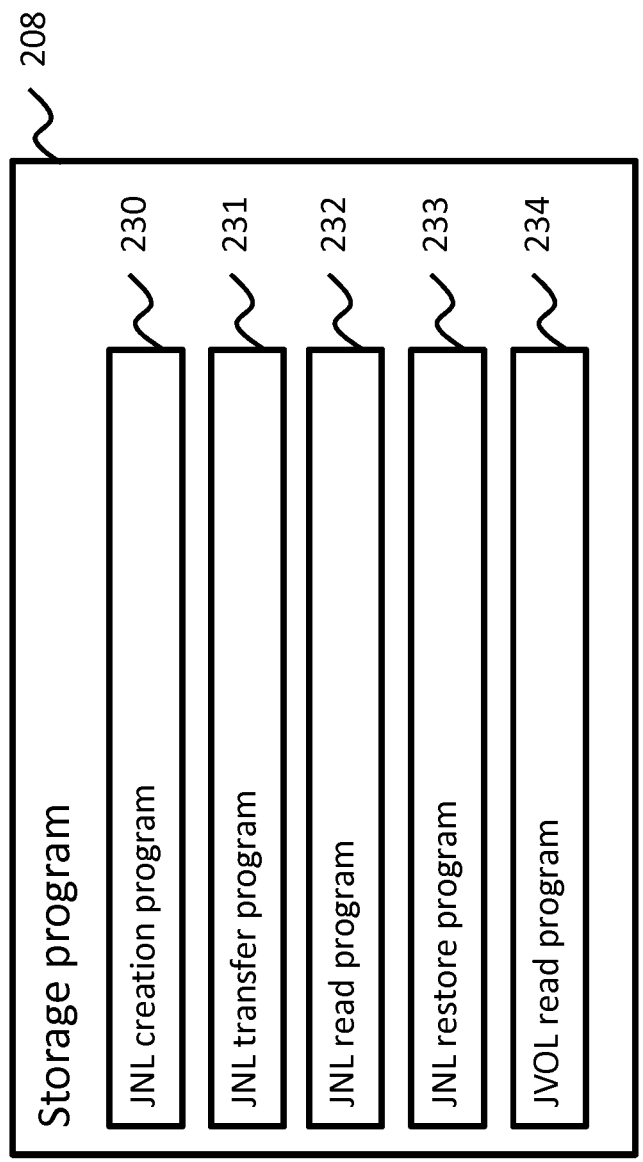
FIG. 6 is a detailed block diagram showing an example of the storage program.

FIG. 6 is a detailed block diagram showing an example of the storage program 208. A JNL creation program 230 and a JNL transfer program 231 are executed in the primary storage system. A JNL read program, a JNL restore program and a JVOL read program are executed in the secondary storage system. The JNL creation program 230 is a program to create JNL. The JNL transfer program 231 is a program to send the JNLs to the secondary storage system. The JNL read program 232 is a program to issue read command and receive the JNLs from the primary storage system. The JNL restore program 233 is a program to write the JNL data to the secondary volume. The JVOL read program 234 is a program to transfer the JNL data from the JVOL. The details of these programs are described below.

Figure 7:
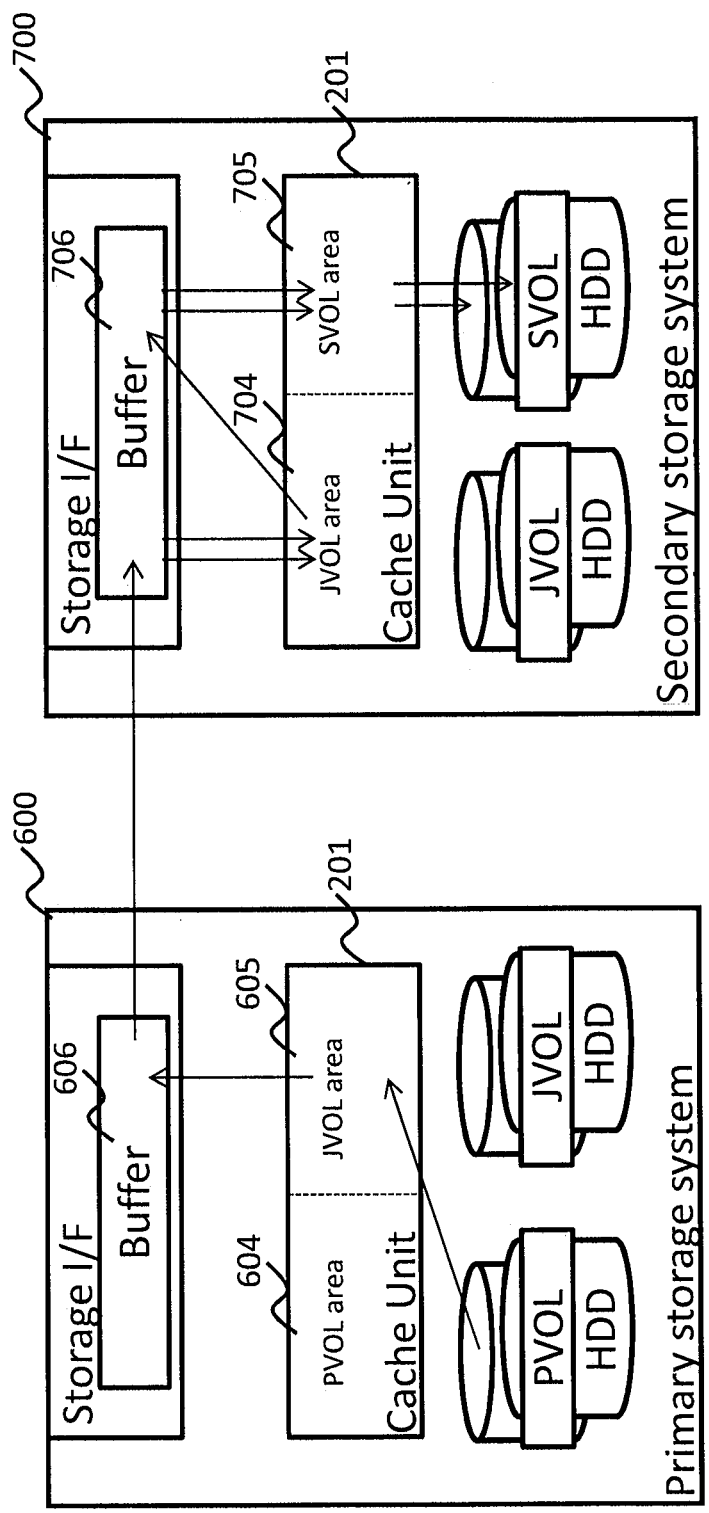
FIG. 7 shows an example of how many times each hardware is accessed for remote copy processing, which is a problem to be solved by this invention.

FIG. 7 shows an example of how many times each hardware is accessed for remote copy processing, which is a problem to be solved by this invention. The example of FIG. 7 involves the situation of transferring the JNL to the secondary volume initially from the primary volume. The JNL data is already stored in the primary volume and the JNCB has the address of the primary volume. The processing flow of JNCB creation is described in FIG. 9. It is assumed that the data of HDD is mirrored by using RAID1. Thus, the write of the data to the HDD is executed twice.

First, the data is read from HDD corresponding to the PVOL and is written to the cache unit 201 as JNL data in JVOL area 605. Second, the JNL data is transferred to the buffer 606 of the storage I/F in the primary storage system. Third, the JNL data is transferred again to the buffer 706 of the storage I/F in the secondary storage system. Forth, the transferred JNL data is written into cache unit 201 as JVOL data in JVOL area 704. At this time, the mirrored data is created. Thus, two times of the writes to the cache unit 201 are executed. The transfer processing of the third step is executed in parallel by one or more processors and one or more JNL transfer jobs. Waiting is done on JVOL so that restore processing is restored in the order of the sequence number. After the waiting, the JNL data is transferred to the cache unit 201 as SVOL data in SVOL area 705 via the buffer 706. One of the mirrored data is read from the cache unit 201 and the data transferred from the buffer 706 twice. Thus, one time of the read and two times of the writes to the cache unit 201 are executed. Finally, the data is transferred to the HDDs consisting of mirror. Thus, two times of the reads to the cache unit 201 are executed. In the case of an initial copy, seven times of the accesses to the cache unit 201 are executed in the secondary storage system. The forth step increases resource consumption of the cache unit 201, the buffer 706, and processors, and causes performance decrease.

Figure 8:
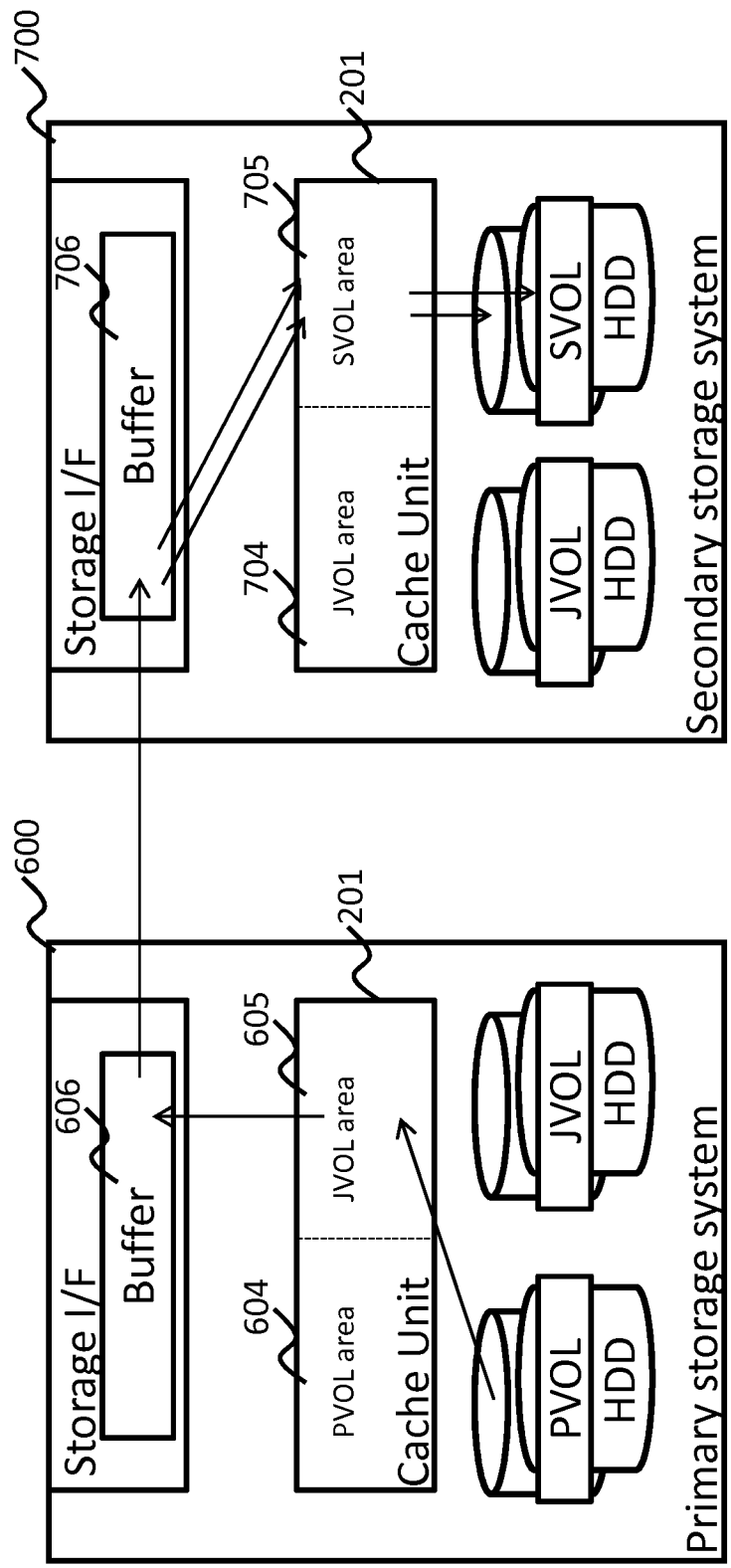
FIG. 8 is a conceptual diagram illustrating an embodiment of this invention to solve the problem shown in FIG. 7.

FIG. 8 is a conceptual diagram illustrating an embodiment of this invention to solve the problem shown in FIG. 7. This embodiment transfers the JNL data to the SVOL area 705 directly without transferring it to the JVOL area 704 from the buffer 706 in the secondary storage system 700 as shown in FIG. 8. Only when the predetermined conditions to assure the data consistency are satisfied is direct transfer from the buffer 706 to the SVOL area 705 executed. To be specific, when restore addresses (SVOL addresses) of one or more JNLs are not the same, even if there is unrestored JNLs with smaller sequence number than the JNL's sequence number, the storage system restores the JNL. The JNL transfer processing is described in FIGS. 9 to 17.

Figure 9:
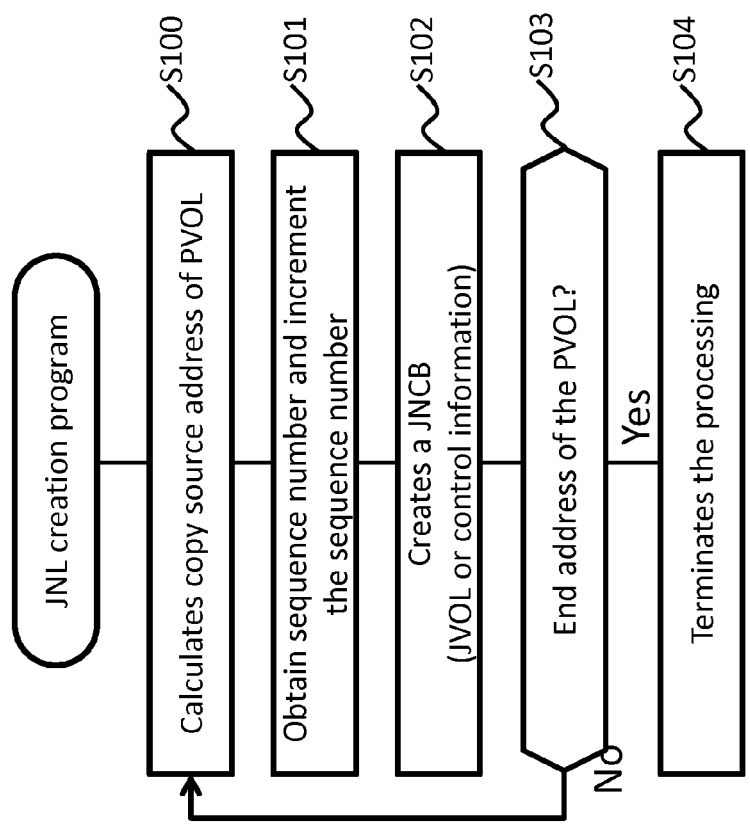
FIG. 9 is a flow diagram illustrating an example of the process of the JNL creation program.

FIG. 9 is a flow diagram illustrating an example of the process of the JNL creation program 230 which causes JNL to copy the PVOL data to the SVOL in the primary storage system. First, the volume copy program calculates the source address of the PVOL (step S100). At the time of the start of processing, this value is a head address of the PVOL. Then, the program obtains the current sequence number and increments it (step S101). After that, the program creates the JNCB and stores it to the JVOL (step S102). The JNCB includes obtained PVOL address, sequence number, SVOL ID, etc. In general, the remote copy functionality has a remote copy pair table to manage the secondary storage system ID and SVOL ID corresponding to the PVOL. In this embodiment, the pair table is omitted. The JNCB could be stored to the storage control information. Next, the program confirms whether the PVOL address is the end address of the PVOL (step S103). If the PVOL address is the end address, it means that JNL creation of all PVOL area is completed. Thus, the program terminates the processing (step S104). If the result of step S103 is "no," the program returns back to step S100 and processes for the next address of the PVOL. The JNLs are created to all areas of the PVOL by the program.

Figure 10:
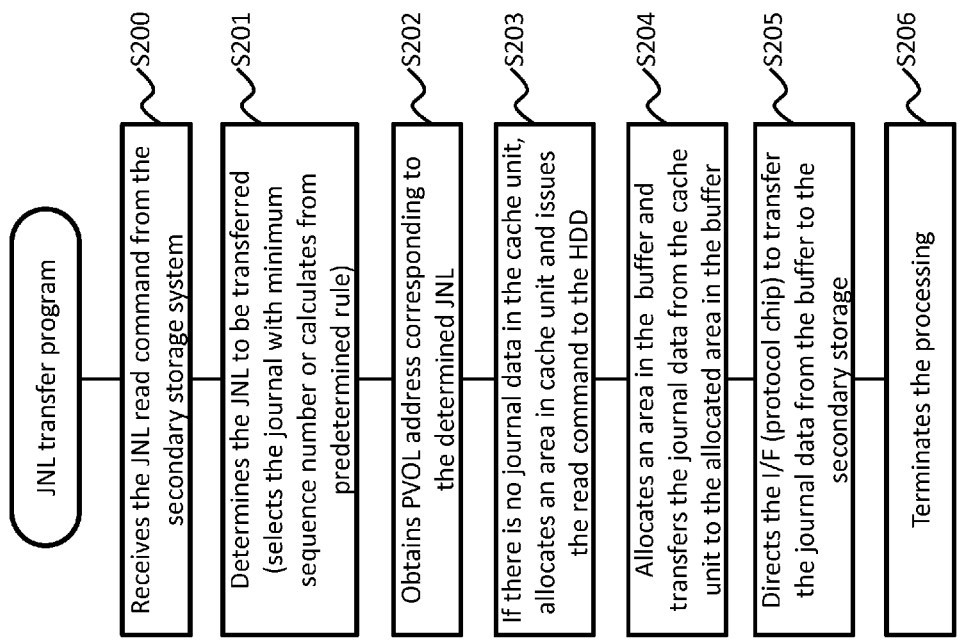
FIG. 10 is a flow diagram illustrating an example of the process of the JNL transfer program.

FIG. 10 is a flow diagram illustrating an example of the process of the JNL transfer program 231 which receives the JNL read request from the secondary storage system and transfers the JNL. First, the JNL transfer program receives the JNL read request from the secondary storage system (S200). Then, the program determines the JNL to be transferred (S201). One or more determination methods can be considered. For example, a predetermined number is chosen from the minimum sequence number. Or the rule which can calculate the sequence numbers for processing is created by using a job ID, etc. Next, the program obtains the PVOL address corresponding to the determined JNL (S202). This processing is realized by referring to the PVOL address information in the JNCB. If there is no data corresponding to the obtained PVOL address in the cache unit, the program allocates an area in the cache unit and issues the read request to the HDD (S203). After the data was stored in the cache unit, the program allocates an area in the buffer and transfers the JNCB and JNL data from the cache unit to the allocated area (S204). Then, the program directs the storage I/F to transfer the JNL from the buffer to the secondary storage system (S205) and terminates the processing (S206).

The processing to transfer the JNL data from the buffer to the SVOL directly in the secondary storage system has been described. The processing is confirmed whether restoration addresses of each JNL is the same before restoration for data consistency. If the addresses are not the same, the restoration is executed.

Figure 11:
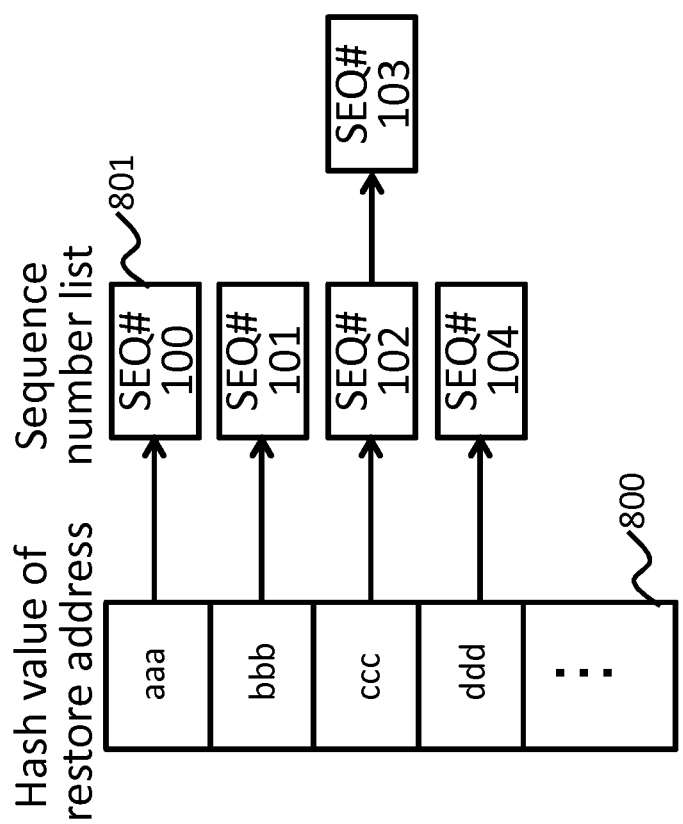
FIG. 11 is an example of the restore destination table.

FIG. 11 is an example of the restore destination table 222 to check the restoration address. The hash value entries 800 calculated from the restoration address is shown on the left side of the figure. The restoration address means the SVOL ID (identifier) plus address in the SVOL. The SVOL ID plus address in SVOL can also be used instead of the hash value. By using the hash value, the size of the table can be reduced. A sequence number list 801 is managed for the hash value entry 800. SEQ# means sequence number. In the example, the hash value calculated from the restoration address of the JNL with sequence number "100" is "aaa." The hash value of sequence number "102" and "103" is "ccc." It means that the restoration address is the same. Thus, the JNL with sequence number 102 smaller than sequence number "103" should be restored first. In the restoration processing, the data consistency is assured by checking the restoration address in this table.

To assure the data consistency, another piece of control information is needed. The control information is described in FIG. 12. For example, there is no JNL with the same restoration address as the sequence number "100" or "101" in FIG. 11. However, the restoration address of JNL with sequence number "99" which is not yet transferred to the secondary storage system may be the same. Since JNL transfer to the secondary storage system is performed in parallel using one or more processors, jobs and physical paths, the JNL with sequence number "99" may arrive behind time. In this case, if the JNL with sequence number "100" or "101" is restored, the SVOL data may be inconsistent.

Figure 12:
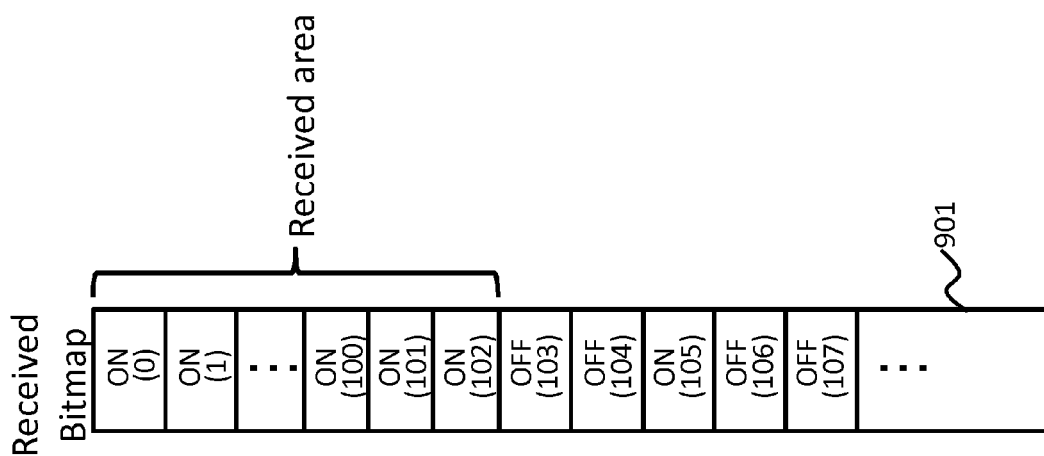
FIG. 12 is an example of the received sequence number bitmap.

FIG. 12 is an example of the received sequence number bitmap 221. The received sequence number bitmap 221 is used to avoid data inconsistency as mentioned above. The received bitmap 901 manages the arrival status of JNL. "ON" means that the JNL is already received. The number in parenthesis means SWQ#. The JNL with sequence number from "0" to "102," and "105" is already received and the JNL with sequence number "103" and etc. is not received yet. In the case of a simple data structure like the example, the size of the received sequence number bitmap 221 is very large. There are some techniques to reduce the size of the control information. After using the final bit, the first bit can be reused with SEQ# other than SEQ# "0." In this case, the control information which manages to which SEQ# the first bit corresponds is needed. For example, if the final bit is used with SEQ# "100," the first bit is reused with SEQ# "101" and correspondence relation between bit "0" and SEQ# "101" is managed. The address check processing using the restore destination table 222 is executed for the range which the JNLs are received without omission to avoid the inconsistency mentioned in FIG. 11. Since the data inconsistency may be caused if the JNL is not in the range, direct restoration to the SVOL is not performed at that time. Next, the JNL read processing in consideration of the explanation of FIG. 11 and FIG. 12 is described.

Figure 13:
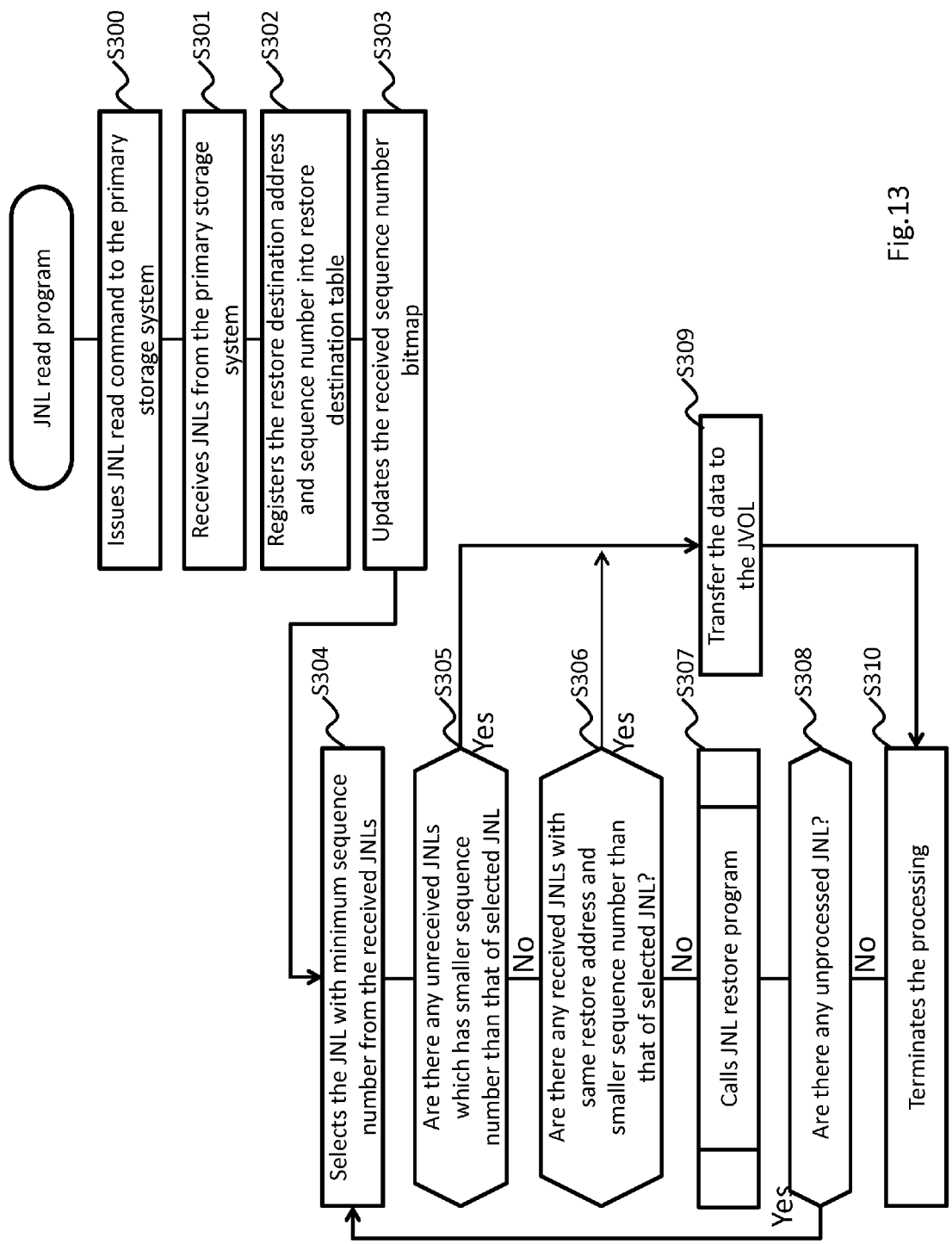
FIG. 13 is a flow diagram illustrating an example of the process of the JNL read program.

FIG. 13 is a flow diagram illustrating an example of the process of the JNL read program 232. First, the JNL read program issues a JNL read request to the primary storage system (step S300) and receives JNLs from the primary storage system (step S301). Then, the program calculates the hash value from the restoration address and registers the hash value and sequence number into restore destination table 222 for each JNLs (step S302). Moreover, the program updates the received sequence number bitmap 221 for each of the JNLs (step S303). After updating control information, the program selects the JNL which has the minimum sequence number from the received JNLs (step S304). Then, the program confirms whether there are any unreceived JNLs which have smaller sequence number than the sequence number of the selected JNL (step S305). This confirmation is realized by using the received sequence number bitmap 221 in FIG. 12. If the result of step S305 is "no", the program confirms whether there are any received JNLs which has same restore address as selected JNL and smaller sequence number than that of selected JNL (step S306). If the result of step S306 is "No," the data consistency is assured when the JNL is restored from the buffer to the SVOL directly. Thus, the program proceeds to step S307 and calls the JNL restore program 233 for restoration (step S307). After restoration of the SEQ# in step S307, that SEQ# is deleted from FIG. 11. After step S307, if there are any unprocessed JNLs (step S308), the program returns back to step S304 and executes the processing for the next JNL which has the minimum sequence number. If the result of step S305 or step S306 is "yes," the program proceeds to step S309 and transfers the data to the JVOL (step S309). This JNL read processing is executed in parallel by using one or more processors and jobs.

Before proceeding to step S309, step S305 or S306 could be executed again after waiting for a predetermined period. This is because the conditions of step S305 or S306 may be fulfilled by execution of another JNL read or JNL restore processing during the wait. The program proceeds to step S310 and terminates the processing, when there are no unprocessed JNLs, or when step S309 is completed (step S310). If the result of step S306 is "yes," the program could proceed to step S304 after transfer of the selected JNL data to the JVOL in step S309. This is because the JNL which can be restored may be in the received JNLs. In the example of FIG. 11, the sequence number "104" can be restored even if "103" cannot be processed. This JNL read program 232 is executed periodically to transfer the next JNLs.

Figure 14:
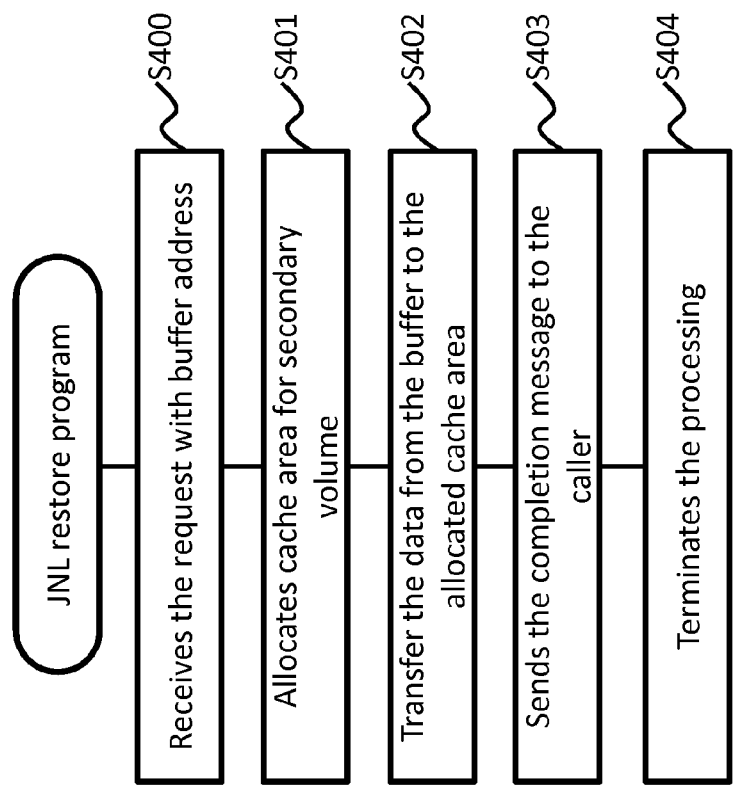
FIG. 14 is a flow diagram illustrating an example of the process of JNL restore program.

FIG. 14 is a flow diagram illustrating an example of the process of JNL restore program 233 called from JNL read program 232. This program transfers the JNL data from the buffer to the SVOL in the secondary storage system. First, the JNL restore program is called from another program. The program receives buffer address from the caller (step S400). Then, the program allocates an area in the cache unit for the secondary volume (step S401) and transfers the data stored in the buffer to the allocated area (step S402). This transferred data is stored in the cache unit as SVOL data, not JVOL data. Finally, the program sends the completion message to the caller and terminates the processing (steps S403 and S404).

Figure 15:
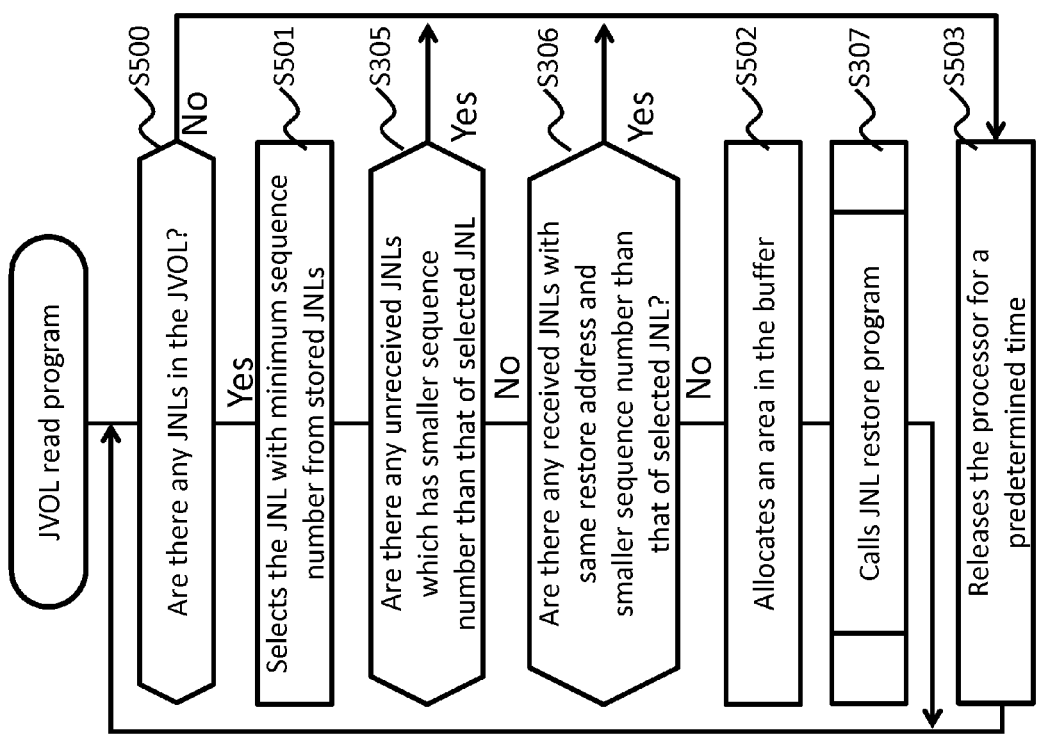
FIG. 15 is a flow diagram illustrating an example of the process of the JVOL read program

The JNL may be transferred to the JVOL in step S309 of the JNL read program 232. The processing to restore the JNL from the JVOL is needed. FIG. 15 is a flow diagram illustrating an example of the process of the JVOL read program 234 to restore the JNL from the JVOL. First, the JVOL read program confirms whether there are any JNLs in the JVOL (step S500). Then, the program selects the JNL which has the minimum sequence number from the stored JNLs (step S501). Next, the program executes the processing the same as step S305 and S306 in FIG. 13. If both results of step S305 and step S306 are "no," the program allocates an area in the buffer (step S502) and calls the JNL restore program 233 (step S307). Then, the program returns back to step 500 and executes the processing for the next JNL which has the minimum sequence number. If the result of step S305 or step S306 is "yes," the program proceeds to step S503 and releases the processor for a predetermined time. After step S503, the program returns back to step S500 and executes the processing for the same JNL.

Figure 16:
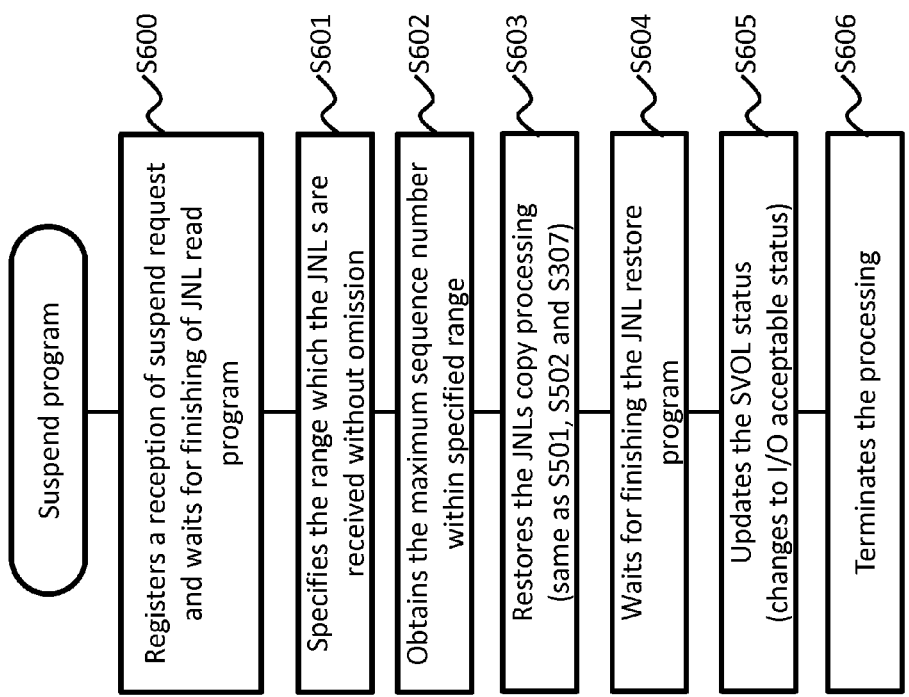
FIG. 16 is a flow diagram illustrating an example of the process of a suspend program.
Figure 17:
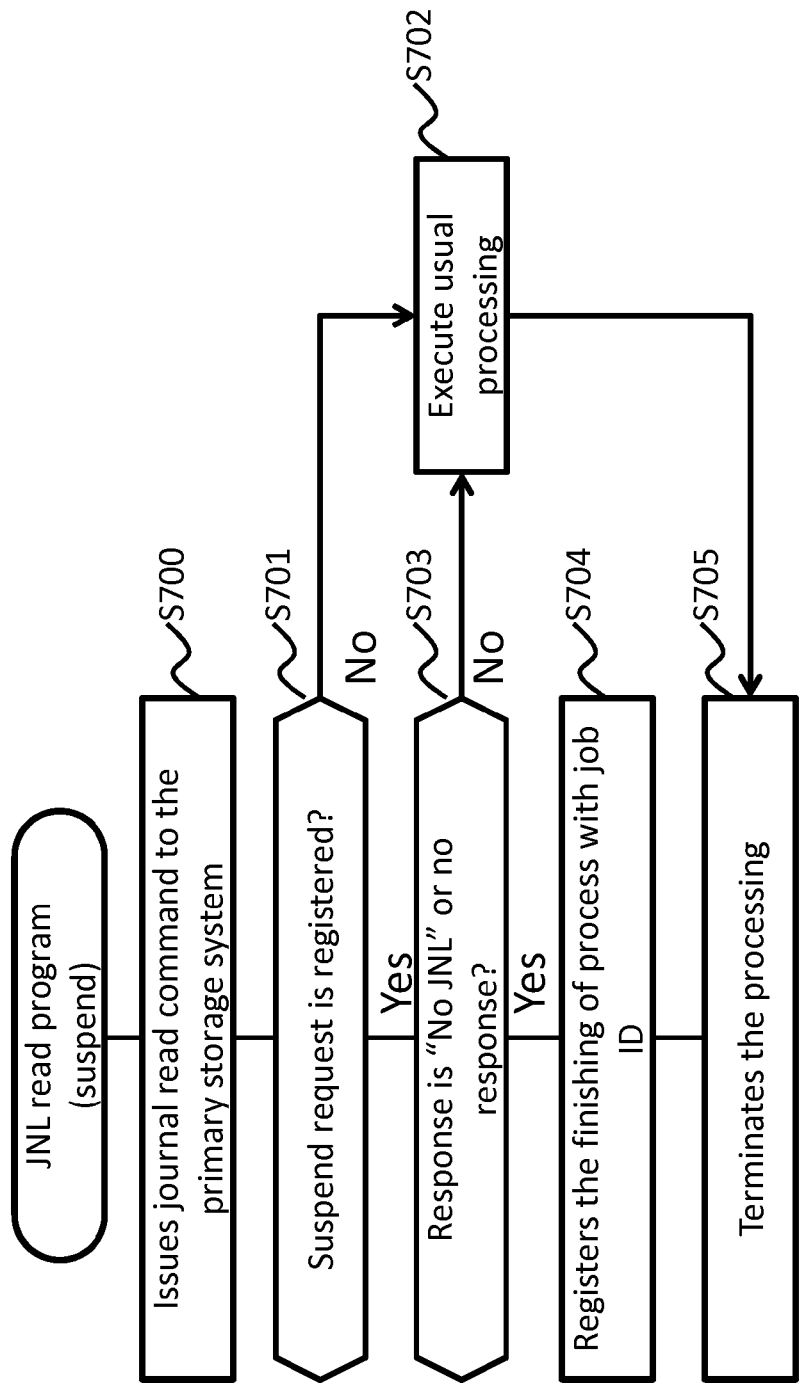
FIG. 17 is a flow diagram illustrating an example of finishing processing of the JNL read program after receiving the suspend request.

As mentioned above, the secondary storage system transfers the data from the buffer to the SVOL directly when there are no other JNLs which have the same restoration address. Thus, strictly speaking, a restoration order of a JNL differs from an order of sequence number. However, when the SVOL is accessed from the server after failure, the SVOL must have consistent status which means the restoration to a certain sequence number is completed and the restoration after the certain sequence number is not complete. In FIG. 16 and FIG. 17, the processing to provide consistent SVOL status is described.

FIG. 16 is a flow diagram illustrating an example of the process of a suspend program which receives a suspend request from the server or a management server and changes the remote copy pair status for using the SVOL from the server. First, the suspend program receives the suspend request from the server or the management server and registers the receiving of suspend request. The suspend request could be notified by a group for consistency or remote copy pair. The program waits for completion of the JNL read program 232 which finishes the processing based on the suspend request (step S600). After completion of the JNL read program, the suspend program specifies the range which the JNLs are received without omission (S601). In the case after the primary storage failure, all JNL created in the primary storage system may not arrive to the secondary storage system. Then, the program obtains the maximum sequence number within the range (step S602). At that time, the certain sequence number for the SVOL data consistency is determined. Next, the program restores the JNLs to the obtained maximum sequence number (step S603). This processing is the same as step, S501, S502, and S307 in FIG. 15. Then, the program waits for completion of the JNL restore program 233 called in step S603. Finally, the program updates the SVOL status to I/O acceptable status (step S605) and terminates the processing (step S606).

FIG. 17 is a flow diagram illustrating an example of finishing processing of the JNL read program 232 after receiving the suspend request. First, the program issues a JNL read request to the primary storage system (S700). Then, the program confirms whether a suspend request from the server is received or not (step S701). This confirmation could be realized by reading the information set in step S600 in FIG. 16. If the suspend request is not received, the program executes usual processing described in FIG. 13 (step S702). If the suspend request is received, the program executes to finish the processing. If the response from the primary storage system is "No JNL" or no response (step S703), the program registers the finishing of the processing with job ID (step S704). In step S600, the suspend program waits for completion of the JNL read program based on this information. After the registration, the program terminates the processing (step S705). If the result of step S703 is "no," the program proceeds to step S702 and executes the usual processing. This is because there are some untransferred JNLs in the primary storage system. After step S702, the program terminates the processing in step S705 without registering completion of the processing. Thus, the JNL read program will be executed again.

Of course, the system configurations illustrated in FIGS. 1, 2, and 8 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for reducing the number of times of data transfer within the storage system during data copy such as remote copy. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A storage system comprising:
   a plurality of storage devices; and
   a controller operable to manage a secondary volume, of a remote copy pair with a primary volume of another storage system, and corresponding to a portion of the plurality of storage devices;
   wherein the secondary volume has a function for storing data included in journal data sent from said another storage system according to an asynchronous remote copy procedure;
   wherein the controller is operable to handle the journal data to be stored temporarily in a third volume corresponding to another portion of the plurality of storage devices before storing the data of the journal data to the secondary volume, if a relationship between the journal data and another journal data, which has smaller sequence number than sequence number of the journal data and is sent from said another storage system to the storage system, does not satisfy a preset condition to assure data consistency;
   wherein the controller is operable to write the journal data in the secondary volume directly without being stored temporarily in the third volume, if the relationship between the journal data and said another journal data satisfies the preset condition to assure data consistency; and
   wherein the controller is operable to:
   receive a plurality of journal data each with a sequence number from said another storage system, the sequence number being control information to manage a write order for writing data to the primary volume;
   select a journal data from the plurality of received journal data which has not been stored to the secondary volume or the third volume;
   determine whether there is any unreceived journal data which has a smaller sequence number than the sequence number of the selected journal data;
   if there is unreceived journal data as said another journal data which has a smaller sequence number than the sequence number of the selected journal data, as the condition, then store data of the selected journal data temporarily in the third volume before storing the data of the selected journal data to the secondary volume;
   if there is no unreceived journal data which has a smaller sequence number than the sequence number of the selected journal data, then determine whether there is any received journal data which has a smaller sequence number than the sequence number of the selected journal data and which has a same hash value of restore address as the selected journal data, the restore address being an address in the secondary volume to write journal data; and
   if there is no received journal data as said another journal data which has a smaller sequence number than the sequence number of the selected journal data and which has a same hash value of restore address as the selected journal data, then write the selected journal data in the secondary volume directly without being stored temporarily in the third volume.

2. The storage system according to claim 1, further comprising a buffer, wherein the controller is operable to:
store the received journal data in the buffer; and
if there is unreceived journal data as said another journal data which has a smaller sequence number than the sequence number of the selected journal data, as the condition, then store data of the selected journal data temporarily in the third volume from the buffer before transferring the data of the selected journal data from the third volume to the buffer and then storing the data of the selected journal data from the buffer to the secondary volume.

3. The storage system according to claim 2, wherein the controller is operable, if there is no received journal data as said another journal data which has a smaller sequence number than the sequence number of the selected journal data and which has a same hash value of restore address as the selected journal data, to:
write the selected journal data in the secondary volume directly from the buffer without being stored temporarily in the third volume.

4. The storage system according to claim 2, wherein controller is operable to:
if there is no unreceived journal data which has a smaller sequence number than the sequence number of the selected journal data and if there is received journal data as said another journal data which has a smaller sequence number than the sequence number of the selected journal data and which has a same hash value of restore address as the selected journal data, the restore address being an address in the secondary volume to write journal data, as the condition, then store data of the selected journal data temporarily in the third volume from the buffer before transferring the data of the selected journal data from the third volume to the buffer and then storing the data of the selected journal data from the buffer to the secondary volume.

5. The storage system according to claim 1,
wherein the controller is operable, if there is received journal data as said another journal data which has a smaller sequence number than the sequence number of the selected journal data and which has a same hash value of restore address as the selected journal data, as the condition, then store data of the selected journal data temporarily in the third volume before storing the data of the selected journal data to the secondary volume.

6. The storage system according to claim 1, wherein the third volume is a journal volume (JVOL) area to store journal data temporarily.

7. The storage system according to claim 1, further comprising:
a buffer;
wherein the journal data sent from said another storage system is stored in the buffer before the data of the journal data is stored to the secondary volume or the third volume.

8. A system which includes a primary storage system having a plurality of storage devices; and a secondary storage system, the secondary storage system comprising:
a plurality of storage devices; and
a controller operable to manage a secondary volume, of a remote copy pair with a primary volume of the primary storage system, and corresponding to a portion of the plurality of storage devices in the secondary storage system;
wherein the secondary volume has a function for storing data included in journal data sent from the primary storage system according to an asynchronous remote copy procedure;
wherein the controller is operable to handle the journal data to be stored temporarily in a third volume corresponding to another portion of the plurality of storage devices of the secondary storage system before storing the data of the journal data to the secondary volume, if a relationship between the journal data and another journal data, which has smaller sequence number than sequence number of the journal data and is sent from the primary storage system to the secondary storage system, does not satisfy a preset condition to assure data consistency;
wherein the controller is operable to write the journal data in the secondary volume directly without being stored temporarily in the third volume, if the relationship between the journal data and said another journal data satisfies the preset condition to assure data consistency; and
wherein the controller is operable to:
receive a plurality of journal data each with a sequence number from the primary storage system, the sequence number being control information to manage a write order for writing data to the primary volume;
select a journal data from the plurality of received journal data which has not been stored to the secondary volume or the third volume;
determine whether there is any unreceived journal data which has a smaller sequence number than the sequence number of the selected journal data;
if there is unreceived journal data as said another journal data which has a smaller sequence number than the sequence number of the selected journal data, as the condition, then store data of the selected journal data temporarily in the third volume before storing the data of the selected journal data to the secondary volume;
if there is no unreceived journal data which has a smaller sequence number than the sequence number of the selected journal data, then determine whether there is any received journal data which has a smaller sequence number than the sequence number of the selected journal data and which has a same hash value of restore address as the selected journal data, the restore address being an address in the secondary volume to write journal data; and
if there is no received journal data as said another journal data which has a smaller sequence number than the sequence number of the selected journal data and which has a same hash value of restore address as the selected journal data, then write the selected journal data in the secondary volume directly without being stored temporarily in the third volume.

9. The system according to claim 8, wherein the secondary storage system further comprises a buffer, and wherein the controller is operable to:
store the received journal data in the buffer; and
if there is unreceived journal data as said another journal data which has a smaller sequence number than the sequence number of the selected journal data, as the condition, then store data of the selected journal data temporarily in the third volume from the buffer before transferring the data of the selected journal data from the third volume to the buffer and then storing the data of the selected journal data from the buffer to the secondary volume.

10. The system according to claim 9, wherein the controller is operable, if there is no received journal data as said another journal data which has a smaller sequence number than the sequence number of the selected journal data and which has a same hash value of restore address as the selected journal data, to:
    write the selected journal data in the secondary volume directly from the buffer without being stored temporarily in the third volume.

11. The system according to claim 9, wherein the controller is operable to:
    if there is no unreceived journal data which has a smaller sequence number than the sequence number of the selected journal data and if there is received journal data as said another journal data which has a smaller sequence number than the sequence number of the selected journal data and which has a same hash value of restore address as the selected journal data, the restore address being an address in the secondary volume to write journal data, as the condition, then store data of the selected journal data temporarily in the third volume from the buffer before transferring the data of the selected journal data from the third volume to the buffer and then storing the data of the selected journal data from the buffer to the secondary volume.

12. The system according to claim 8,
    wherein the controller is operable, if there is received journal data as said another journal data which has a smaller sequence number than the sequence number of the selected journal data and which has a same hash value of restore address as the selected journal data, as the condition, then store data of the selected journal data temporarily in the third volume before storing the data of the selected journal data to the secondary volume.

13. The system according to claim 8, wherein the third volume is a journal volume (JVOL) area to store journal data temporarily.

14. The system according to claim 8,
    wherein the secondary storage system further comprises a buffer; and
    wherein the journal data sent from the primary storage system is stored in the buffer before the data of the journal data is stored to the secondary volume or the third volume.

15. A non-transitory computer-readable storage medium storing a plurality of instructions for controlling a data processor for remote copy from a primary storage system to a secondary storage system having a plurality of storage devices, the plurality of instructions comprising:
    instructions that cause the data processor to manage a secondary volume, of a remote copy pair with a primary volume of the primary storage system, and corresponding to a portion of the plurality of storage devices, the secondary volume having a function for storing data included in journal data sent from the primary storage system according to an asynchronous remote copy procedure;
    instructions that cause the data processor to handle the journal data to be stored temporarily in a third volume corresponding to another portion of the plurality of storage devices of the secondary storage system before storing the data of the journal data to the secondary volume, if a relationship between the journal data and another journal data, which has smaller sequence number than sequence number of the journal data and is sent from the primary storage system to the secondary storage system, does not satisfy a preset condition to assure data consistency;
    instructions that cause the data processor to write the journal data in the secondary volume directly without being stored temporarily in the third volume, if the relationship between the journal data and said another journal data satisfies the preset condition to assure data consistency;
    instructions that cause the data processor to receive a plurality of journal data each with a sequence number from the primary storage system, the sequence number being control information to manage a write order for writing data to the primary volume;
    instructions that cause the data processor to select a journal data from the plurality of received journal data which has not been stored to the secondary volume or the third volume;
    instructions that cause the data processor to determine whether there is any unreceived journal data which has a smaller sequence number than the sequence number of the selected journal data;
    instructions that cause the data processor, if there is unreceived journal data as said another journal data which has a smaller sequence number than the sequence number of the selected journal data, as the condition, to store data of the selected journal data temporarily in the third volume before storing the data of the selected journal data to the secondary volume;
    if there is no unreceived journal data which has a smaller sequence number than the sequence number of the selected journal data, instructions that cause the data processor to determine whether there is any received journal data which has a smaller sequence number than the sequence number of the selected journal data and which has a same hash value of restore address as the selected journal data, the restore address being an address in the secondary volume to write journal data; and
    if there is no received journal data as said another journal data which has a smaller sequence number than the sequence number of the selected journal data and which has a same hash value of restore address as the selected journal data, instructions that cause the data processor to write the selected journal data in the secondary volume directly without being stored temporarily in the third volume.

16. The non-transitory computer-readable storage medium according to claim 15, wherein the secondary storage system further comprises a buffer, and wherein the plurality of instructions further comprise:
    instructions that cause the data processor to store the received journal data in the buffer; and
    instructions that cause the data processor, if there is unreceived journal data as said another journal data which has a smaller sequence number than the sequence number of the selected journal data, as the condition, then to store data of the selected journal data temporarily in the third volume from the buffer before transferring the data of the selected journal data from the third volume to the buffer and then storing the data of the selected journal data from the buffer to the secondary volume.

17. The non-transitory computer-readable storage medium according to claim 16, wherein if there is no received journal data as said another journal data which has a smaller sequence number than the sequence number of the selected journal data and which has a same hash value of restore address as the selected journal data, the plurality of instructions further comprise:

instructions that cause the data processor to write the selected journal data in the secondary volume directly from the buffer without being stored temporarily in the third volume.

18. The non-transitory computer-readable storage medium according to claim 16, wherein the plurality of instructions further comprise:

instructions that cause the data processor, if there is no unreceived journal data which has a smaller sequence number than the sequence number of the selected journal data and if there is received journal data as said another journal data which has a smaller sequence number than the sequence number of the selected journal data and which has a same hash value of restore address as the selected journal data, the restore address being an address in the secondary volume to write journal data, as the condition, then to store data of the selected journal data temporarily in the third volume from the buffer before transferring the data of the selected journal data from the third volume to the buffer and then storing the data of the selected journal data from the buffer to the secondary volume.

19. The non-transitory computer-readable storage medium according to claim 15, wherein the plurality of instructions further comprise, if there is no unreceived journal data which has a smaller sequence number than the sequence number of the selected journal data:

instructions that cause the data processor, if there is received journal data as said another journal data which has a smaller sequence number than the sequence number of the selected journal data and which has a same hash value of restore address as the selected journal data, as the condition, to store data of the selected journal data temporarily in the third volume before storing the data of the selected journal data to the secondary volume.

20. The storage system according to claim 1, wherein the controller is operable to select a journal data with a smallest sequence number from the plurality of received journal data which has not been stored to the secondary volume or the third volume.

* * * * *